United States Patent
Church et al.

(10) Patent No.: US 11,958,246 B2
(45) Date of Patent: Apr. 16, 2024

(54) LASER OVEN WITH TRANSPARENT CHAMBER AND EXTERNAL LASER SOURCE

(71) Applicants: Sciperio, Inc, Orlando, FL (US); Curtis Wayne Hill, Meridianville, AL (US)

(72) Inventors: Kenneth H. Church, Orlando, FL (US); Paul I. Deffenbaugh, Orlando, FL (US); Casey W. Perkowski, Winter Park, FL (US); Curtis Wayne Hill, Meridianville, AL (US)

(73) Assignee: SCIPERIO, INC, Orlando, FL (US)

( * ) Notice: Subject to any disclaimer, the term of this patent is extended or adjusted under 35 U.S.C. 154(b) by 46 days.

(21) Appl. No.: 17/189,923

(22) Filed: Mar. 2, 2021

(65) Prior Publication Data
US 2021/0276257 A1 Sep. 9, 2021

Related U.S. Application Data

(60) Provisional application No. 62/984,620, filed on Mar. 3, 2020.

(51) Int. Cl.
*B29C 64/268* (2017.01)
*B29C 64/232* (2017.01)
(Continued)

(52) U.S. Cl.
CPC .......... *B29C 64/268* (2017.08); *B29C 64/232* (2017.08); *B29C 64/25* (2017.08);
(Continued)

(58) Field of Classification Search
CPC ..... B29C 64/268; B29C 64/232; B29C 64/25; B29C 64/364; B29C 64/393; B33Y 10/00;
(Continued)

(56) References Cited

U.S. PATENT DOCUMENTS 2,957,064 A * 10/1960 Comenetz ................ H05B 6/32
373/138
8,795,444 B1 * 8/2014 Kisner ..................... C21D 1/38
62/118

(Continued)

FOREIGN PATENT DOCUMENTS

| CA | 2790861 A1 * | 9/2011 | ............... H01S 3/30 |
| CA | 2991516 A1 * | 10/2013 | ............ B22F 1/0088 |

(Continued)

OTHER PUBLICATIONS

CN 106807712 teanslation (Year: 2022).*
(Continued)

*Primary Examiner* — Francisco W Tschen
*Assistant Examiner* — Guy F Mongelli
(74) *Attorney, Agent, or Firm* — Goodhue, Coleman & Owens, P.C.

(57) ABSTRACT

An apparatus includes a transparent chamber having a space therein for containing an object while heating under vacuum, at least one directed energy source configured to direct energy to heat the object positioned within the space of the transparent chamber, a cap on the transparent chamber, and a connection between the transparent chamber and at least one vacuum for creating a vacuum within the transparent chamber. The apparatus may further include at least one temperature sensor to measure temperature of the object. The apparatus may further include a control system, the control system operatively connected to the at least one temperature sensor and the at least one directed energy source and wherein the control system is a closed loop system to adjust laser power to provide more or less energy to heat or maintain the temperature of the object.

18 Claims, 4 Drawing Sheets

(51) Int. Cl.
  *B29C 64/25*  (2017.01)
  *B29C 64/364*  (2017.01)
  *B29C 64/393*  (2017.01)
  *B33Y 10/00*  (2015.01)
  *B33Y 30/00*  (2015.01)
  *B33Y 50/02*  (2015.01)

(52) U.S. Cl.
  CPC .......... *B29C 64/364* (2017.08); *B29C 64/393* (2017.08); *B33Y 10/00* (2014.12); *B33Y 30/00* (2014.12); *B33Y 50/02* (2014.12)

(58) Field of Classification Search
  CPC ......... B33Y 30/00; B33Y 50/02; B33Y 40/00; B22F 2999/00; B22F 10/50; B22F 10/64; B22F 10/25; B22F 12/00; B22F 12/38; B22F 12/45; B22F 12/82; B22F 12/84; Y02P 10/25
  See application file for complete search history.

(56) References Cited

U.S. PATENT DOCUMENTS

| | | | |
|---|---|---|---|
| 10,288,979 B1 * | 5/2019 | Wang | G02F 1/29 |
| 10,299,722 B1 * | 5/2019 | Tran | B33Y 80/00 |
| 2001/0014403 A1 * | 8/2001 | Brown | B22F 10/28 |
| | | | 75/235 |
| 2002/0196509 A1 * | 12/2002 | Smilanski | H04J 14/005 |
| | | | 398/194 |
| 2003/0178734 A1 * | 9/2003 | Josephy | B22F 9/12 |
| | | | 427/255.6 |
| 2003/0203205 A1 * | 10/2003 | Bi | B22F 1/0545 |
| | | | 428/402 |
| 2005/0121143 A1 * | 6/2005 | Daugherty | H01J 37/32449 |
| | | | 156/345.29 |
| 2005/0173380 A1 * | 8/2005 | Carbone | B23K 15/002 |
| | | | 219/121.31 |
| 2007/0210045 A1 * | 9/2007 | Aso | B23K 26/1476 |
| | | | 219/121.71 |
| 2008/0151349 A1 * | 6/2008 | Hochberg | H01S 1/02 |
| | | | 359/325 |
| 2008/0173641 A1 * | 7/2008 | Hadidi | H05H 1/30 |
| | | | 219/121.36 |
| 2009/0245762 A1 * | 10/2009 | Kao | F24C 7/00 |
| | | | 392/416 |
| 2010/0288196 A1 * | 11/2010 | Gilman | H01L 21/02628 |
| | | | 118/723 R |
| 2010/0298739 A1 * | 11/2010 | Steube | A61M 5/3275 |
| | | | 600/576 |
| 2012/0170013 A1 * | 7/2012 | Tsuji | G03F 7/701 |
| | | | 355/77 |
| 2013/0066263 A1 * | 3/2013 | Yoh | A61M 5/30 |
| | | | 604/70 |
| 2015/0294743 A1 * | 10/2015 | Zheng | G21B 1/15 |
| | | | 376/107 |
| 2015/0367448 A1 * | 12/2015 | Buller | H05B 6/68 |
| | | | 219/74 |
| 2016/0303795 A1 * | 10/2016 | Liu | B29C 64/364 |
| 2016/0311021 A1 * | 10/2016 | Elfstroem | B22F 10/20 |
| 2016/0336168 A1 * | 11/2016 | Blondia | H01J 61/302 |
| 2018/0010237 A1 * | 1/2018 | Forseth | C23C 14/50 |
| 2018/0065182 A1 * | 3/2018 | Money | B33Y 30/00 |
| 2018/0065302 A1 * | 3/2018 | Arai | B29C 64/245 |
| 2018/0147670 A1 * | 5/2018 | Wiggins | B33Y 10/00 |
| 2019/0049841 A1 * | 2/2019 | Okamoto | B29C 64/106 |
| 2019/0092951 A1 * | 3/2019 | Wang | C09D 11/101 |
| 2020/0063093 A1 * | 2/2020 | Matheu | C12N 5/0697 |
| 2020/0276257 A1 * | 9/2020 | Majeed | A61K 36/71 |

FOREIGN PATENT DOCUMENTS

| | | | | |
|---|---|---|---|---|
| CA | 3108211 A1 * | 2/2020 | | B22F 9/082 |
| CN | 101677172 A * | 3/2010 | | |
| CN | 104916378 A * | 9/2015 | | B33Y 80/00 |
| CN | 106573306 A * | 4/2017 | | B22F 10/00 |
| CN | 107498043 A * | 12/2017 | | B22F 1/0088 |
| CN | 108698126 A * | 10/2018 | | B22F 10/20 |
| CN | 106564187 B * | 10/2019 | | B22F 10/00 |
| DE | 60033035 T2 * | 8/2007 | | C23C 16/481 |
| DE | 102019110496 A1 * | 10/2019 | | B22F 10/00 |
| WO | WO-2009017721 A2 * | 2/2009 | | G01N 15/06 |
| WO | WO-2014074947 A2 * | 5/2014 | | B22F 10/20 |
| WO | WO-2018031359 A1 * | 2/2018 | | B22F 1/0014 |
| WO | WO-2019185642 A1 * | 10/2019 | | B22F 10/20 |
| WO | WO-2019224564 A1 * | 11/2019 | | B22F 9/008 |

OTHER PUBLICATIONS

CN-101677172-A translation (Year: 2023).*
CN-104916378-A translation (Year: 2023).*
CN-106573306-A translation (Year: 2023).*
CN-108698126-A translation (Year: 2023).*
CN-106564187-B translation (Year: 2023).*
DE-102019110496-A1 translation (Year: 2023).*
Quantum Design, "Laser-based floating zone furnace", Date: unknown, webstie: https://qd-europe.com/de/en/product/materials-science/furnace-for-crystal-fabrication/1-kw-and-2-kw-laser-furnace-for-the-production-of-long-single-crystals.

* cited by examiner

LASER OVEN WITH TRANSPARENT CHAMBER AND EXTERNAL LASER SOURCE

PRIORITY STATEMENT

This application claims priority to U.S. Provisional Patent Application No. 62/984,620 filed Mar. 3, 2020, hereby incorporated by reference in its entirety.

FIELD OF THE INVENTION

The present invention relates to an oven. More particularly, but not exclusively, the present invention relates to a laser oven.

BACKGROUND

Combining heat and vacuum in an oven can be challenging. For low temperatures and low vacuum, this is more easily obtained. For high temperatures and high vacuum, this is challenging, complicated, energy inefficient, physically large and expensive. There are limited materials that can be used to handle high temperatures and hold a vacuum. For extreme temperatures, a cooling system is generally required to contain the heat due to the large volume that needs to be heated. It is not possible to heat locally or directly using conventional heating methods and this means the entire chamber is heated and a good fraction of the heat is wasted. It is not feasible to change the size of the volume since the entire heated chamber is insulated and many times multi-walled. Therefore, there are significant challenges to combining heat and vacuum.

Therefore, what is needed are apparatus, methods, and systems for combining heat and vacuum in an oven.

SUMMARY

Therefore, it is a primary object, feature, or advantage of the present invention to improve over the state of the art.

It is a further object, feature, or advantage of the present invention to combine heat and vacuum in an oven.

It is a still further object, feature, or advantage of the present invention to combine heat and vacuum in an oven in a manner that reduces or eliminates complexity.

Another object, feature, or advantage is to combine heat and vacuum in a manner that allows for heating to occur locally or directly.

Yet another object, feature, or advantage is to provide an over which allows for heating in a vacuum which is energy efficient.

A further object, feature, or advantage is to provide an oven which permits heating under vacuum in a manner which may be incorporated into a 3D printer.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

According to one aspect, a directed energy source or multiple sources are transmitted through a transparent cylinder or other shape to heat an object. The cylinder may be capped on each end with a stainless steel or other material that is connected to a vacuum pump or multiple vacuum pumps. The cylinder may be comprised of quartz and thick enough to handle extreme pressure from high vacuums. The stainless caps may be polished to match against the polished quartz cylinder to provide a vacuum seal. The quartz (or other material) may be coated inside to reflect all the wavelengths of light except the laser wavelength, thus reflecting the emissive energy from the part back onto the part. The coating may be a dielectric stack or other reflective coating. Multiple laser may be positioned around the cylinder to provide a uniform energy pattern on the part. Localized or focused temperature sensors may be used to measure the temperature at strategic points on the part. A closed loop system may be used to adjust the laser power, providing more or less energy to heat or maintain the part temperature. Individual sensors may then provide feedback to specific laser sources for control. The laser can be fiber fed, can be a diode laser or an array of diode lasers, can be a solid state or gas laser. In addition, the size of the cylinder can be quickly changed to reduce the volume or increase the volume as needed. An automated Z inside the transparent cylinder may be used that can lift a plate to the top of the cylinder and then step down in Z. This allows the oven to be used inside a 3D printer.

According to another aspect, an apparatus includes a transparent chamber having a space therein for containing an object while heating under vacuum, at least one directed energy source configured to direct energy to heat the object positioned within the space of the transparent chamber, a cap on the transparent chamber, and a connection between the transparent chamber and at least one vacuum for creating a vacuum within the transparent chamber. The connection may extend through the cap. The apparatus may include a second cap on the transparent chamber. The transparent chamber may be cylindrical in shape and may be formed from quartz having a thickness sufficient to handle pressurization created by the at least on vacuum without affecting structural integrity of the transparent chamber. The cap may be formed of stainless steel. The cap may be polished, and the transparent chamber may be polished such that a tight seal is provided between the cap and the transparent chamber. The transparent chamber may be coated on an inside to reflect all wavelengths of light except wavelengths from the at least one directed energy source. The coating may include a dielectric stack. The at least one directed energy source may include a plurality of lasers positioned around the transparent chamber, the plurality of lasers configured to provide a uniform energy pattern on the object. The apparatus may further include at least one temperature sensor to measure temperature of the object. The apparatus may further include a control system, the control system operatively connected to the at least one temperature sensor and the at least one directed energy source and wherein the control system is a closed loop system to adjust laser power to provide more or less energy to heat or maintain the temperature of the object. The at least one directed energy source may include at least one of a fiber fed laser, a diode laser, an array of diode lasers, a solid-state laser, and a gas laser. The apparatus may be configured to increase or decrease volume of the space. The apparatus may further include plate within the transparent chamber wherein the plate is configured to travel along a Z-axis.

According to another aspect, a 3D printer is provided which includes an apparatus for heating an object while under vacuum.

According to another aspect, a method for heating an object under vacuum is provided. The method includes providing an apparatus comprising a transparent chamber having a space therein for containing the object while heating under vacuum, at least one directed energy source configured to direct energy to heat the object positioned within the space of the transparent chamber, a cap on the transparent chamber, and a connection between the transparent chamber and at least one vacuum. The method further includes heating the object using the at least one directed energy source and operating the at least one vacuum to create a vacuum within the transparent chamber during the heating of the object.

BRIEF DESCRIPTION OF THE DRAWINGS

Illustrated embodiments of the disclosure are described in detail below with reference to the attached drawing figures, which are incorporated by reference herein.

DETAILED DESCRIPTION

Using a directed energy source for heating is more efficient for heating a specific area or volume. If more area or volume needs to be heated, add more directed energy sources to accommodate the size. There are a number of directed energy sources that range in frequency.

The frequency ranges can be RF to light or GHz to hundreds of THz. One advantage of using a THz source, such as a laser, the chamber can be made to be transparent to light. Quartz is a standard, transparent material that is transparent to light and also can be easily made to hold a high vacuum. The combination of a laser and a quartz or other transparent material to hold the vacuum is a more efficient way to heat an object to extreme temperatures in a low to high vacuum.

Figure 1:
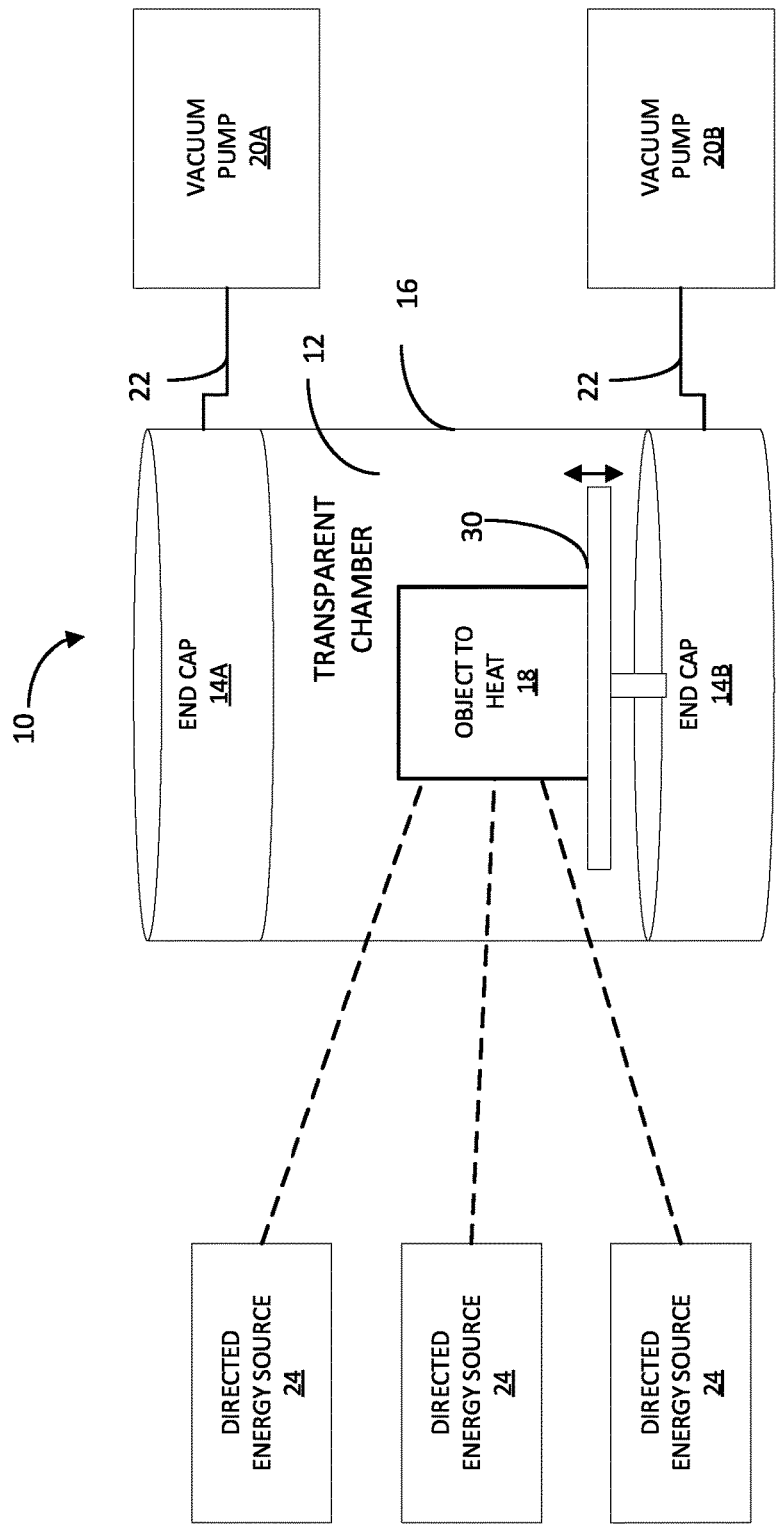
FIG. 1 is a block diagram according to an illustrative embodiment.

FIG. 1 illustrates one example of an apparatus. The apparatus 10 (which may also be referred to as an oven and in some embodiments as a laser oven) includes a transparent chamber 12 with a sidewall 16. As shown, the transparent chamber 12 is cylindrical in shape although shapes and configurations are contemplated. The transparent chamber 12 may be formed of clear quartz or other transparent material such as other types of clear crystalline structure or transparent materials with similar properties. Where a material such as quartz is used, the thickness of the quartz (or other material) should be sufficient to handle pressurization created by the at least one vacuum without affecting structural integrity of the transparent chamber. Quartz is generally advantageous because of the wavelengths that can travel through it and because of the extreme temperatures it can handle. However, other types of materials may include standard glass, and other forms of glass including specially doped glass which provides enhanced heat transfer properties or optimal reflection properties.

There are first and second opposite end caps 14A, 14B on opposite ends of the transparent chamber 12. The end caps 14A, 14B may be formed from stainless steel or other material. One or more vacuum pumps 20A, 20B may be fluidly connected to the transparent chamber 12 with fluid connections 22. Although as shown, one vacuum pump 20A is fluidly connected to the transparent chamber 12 through a first end cap 14A and another vacuum pump 20B is fluidly connected to transparent chamber 12 through the second end cap 14B, it is to be understood that where multiple vacuum pumps 20A, 20B are used both may be connected through one of the end caps 14A or 14B. Other configurations are also contemplated for providing fluid connections to the vacuum pumps 20A, 20B, however, connecting at an end cap where present provides a convenient methodology. One or more end caps may be removed in order to access the object being heated or else openings may be provided to provide access. It is also contemplated that the same end caps may be used with different sizes of transparent chambers. For example, different lengths of chambers may be used to provide for different volumes. Thus, to obtain different volumes, different sizes of chambers may be changed out.

An object to heat 18 is shown disposed within the transparent chamber 12. One or more directed energy sources 24 are used to direct energy towards the object to heat 18 in order to heat the object 18. Each of the directed energy sources 24 may be a laser, radio frequency (RF) energy source, a microwave source, a light source or other type of directed energy source. One or more of the directed energy sources 24 may be a fiber fed laser, a diode laser, an array of diode lasers, a solid-state laser, or a gas laser. As previously explained, there are a number of directed energy sources that range in frequency. The frequency ranges can be RF to light or GHz to hundreds of THz. It is contemplated that the heating may be sufficient to raise the temperature of the object being heated to a desired temperature such as more than 200, 300, 400, 500, 600, 700, 800, 900, or more than 1000 degrees Fahrenheit depending upon the desired application and the material being heated.

Although the directed energy sources 24 are shown to the side of the transparent chamber 12, more or fewer directed energy sources 24 may be used and the directed energy sources may be otherwise positioned such as above, below, or around the transparent chamber. Thus, for example, where the directed energy sources 24 are lasers, the transparent chamber allows the frequency of light for the lasers to pass into the chamber. It is to be understood, however, that the transparent chamber may be coated on the inside to reflect wavelengths of light other than the wavelengths from the lasers. This further promotes heating. The coating, if present, may be a reflective coating such as a dielectric stack. Thus, the transparent chamber readily permits the directed energy to pass through.

As shown in FIG. 1, the object to heat 18 is resting on a plate or platform 30. The plate or platform 20 may be lifted to the top of the chamber 12 and then may be stepped down along the z-axis. This allows the apparatus to be used inside a 3D printer. Of course, the apparatus need not include the platform 20. The oven and 3D printer can be all-in-one, separate, modular, both parts of a common processing line, or otherwise used in conjunction with one another.

Figure 2:
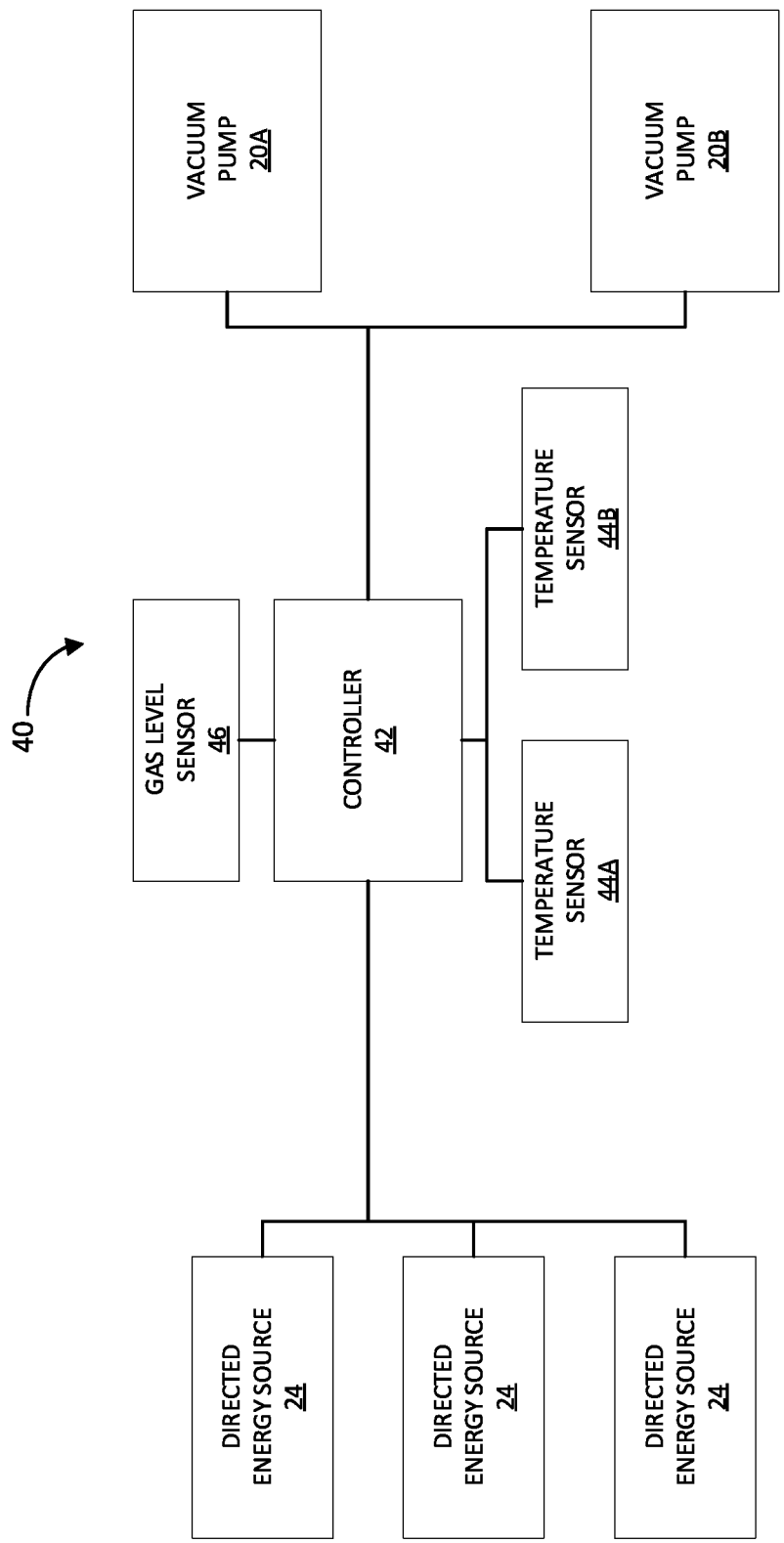
FIG. 2 illustrates a control system for the apparatus of FIG. 1.

FIG. 2 illustrates one example of a control system 40. A controller 42 shown which may include a processor, microcontroller, or other type of intelligent control. The controller is operatively connected to each of the directed energy sources 24. The controller is also operatively connected to one or more temperature sensors 44A, 44B. One or more vacuum pumps 20A, 20B may also be operatively connected to the controller 42 where the controller 42 is controlling both heating and pressurization. In operation, the control system 40 may provide a closed loop system to adjust power associated with the directed energy source(s) 24 to provide more or less energy to heat or maintain the temperature of the object as measured by the one or more temperature sensors 44A, 44B. A gas level sensor 46 may also be present within the chamber and may be operatively connected to the controller 42. The gas level sensor 46 may be used to sense the level of a gas (such as oxygen) within the chamber. The gas level (e.g. oxygen level) within the chamber may be used to estimate the convection of the heat transferred from object to the chamber. It is also contemplated that instead of vacuum, the pumps may be reversed so as to add pressure as opposed to vacuum to allow for processing under pressure. Instead of oxygen as the gas present, any inert gas may be present such as nitrogen, helium and pressure may be added to the temperature process.

Figure 3:
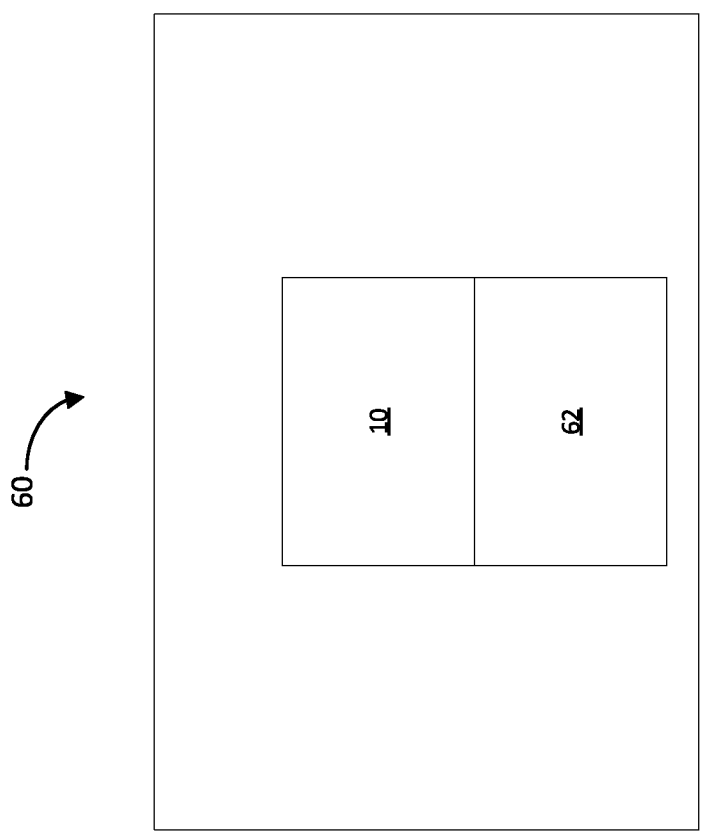
FIG. 3 illustrates a 3D printer containing the apparatus of FIG. 1.

FIG. 3 illustrates that the apparatus 10 shown in FIG. 1 may be incorporated into a system 60 which includes a 3D printer 62. This may be highly advantageous where materials need to be heated under vacuum. The apparatus which may be an oven may be combined with a 3D printer in various ways, such as an all-in-one apparatus, as a separate device, both as modular aspects of a system, or may be used as separate devices along the same processing line.

Having the oven and 3D printer in one system provides advantages for saving space and time. It also provides a means to potentially print part of an object, sinter it, and then change materials and print additional materials. The resulting system is highly advantageous as it can mix low temperature and high temperature materials in the same system.

Figure 4:
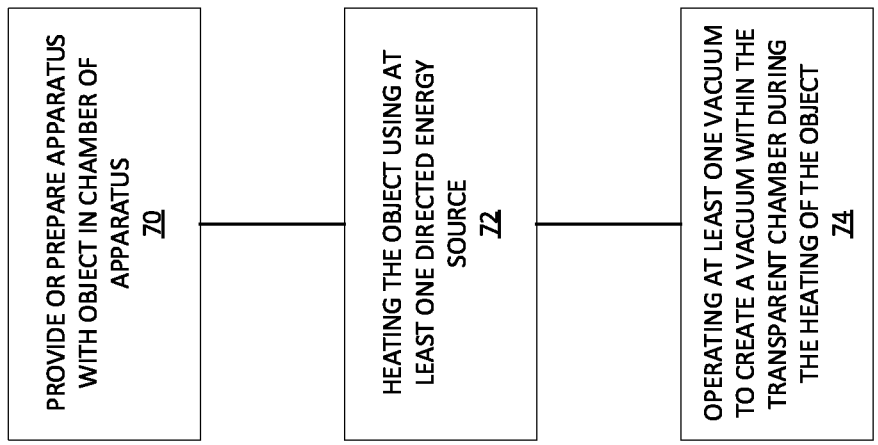
FIG. 4 illustrates one example of a methodology for using the apparatus of FIG. 1.

FIG. 4 illustrates an illustrative methodology. In step 70 an apparatus such as shown and described herein may be provided and/or prepared such as by placing an object within the chamber of the apparatus. In step 72, the object within the apparatus is heated such as by using at least one directed energy source. In step 74, at least one vacuum is operated during the heating to create a vacuum or otherwise change pressurization within the chamber of the object.

The invention is not to be limited to the particular embodiments described herein. In particular, the invention contemplates numerous variations in the size and shape of the chamber, the type of material of the chamber, the type of directed energy sources and the frequency of the directed energy source, the materials used for one or more end caps if present, the manner in which fluid connections are made for one or more vacuum pumps, and numerous other variations, options, and alternatives. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes or methods of the invention. It is understood that any other modifications, substitutions, and/or additions can be made, which are within the intended spirit and scope of the invention.

What is claimed is:

1. An apparatus comprising:
   a transparent chamber having a space therein for containing an object while heating under vacuum, the transparent chamber comprising a side wall extending continuously around to form a complete perimeter of the transparent chamber between a top and a bottom of the transparent chamber, the side wall of the transparent chamber formed from a transparent material, the transparent material being transparent to light;
   at least one directed energy source positioned outside of the transparent chamber and configured to direct energy to heat the object positioned within the space of the transparent chamber;
   a cap on the transparent chamber; and
   a connection between the transparent chamber and at least one vacuum for creating a vacuum within the transparent chamber.

2. The apparatus of claim 1 wherein the connection extends through the cap.

3. The apparatus of claim 1 further comprising a second cap on the transparent chamber.

4. The apparatus of claim 1 wherein the transparent chamber is cylindrical in shape.

5. The apparatus of claim 1 wherein the transparent material is formed from quartz.

6. The apparatus of claim 5 wherein a thickness of the quartz is sufficient to handle pressurization created by the at least one vacuum without affecting structural integrity of the transparent chamber.

7. The apparatus of claim 1 wherein the cap comprises stainless steel.

8. The apparatus of claim 1 wherein the cap is polished and the transparent chamber is polished.

9. The apparatus of claim 1 wherein the transparent chamber is coated on an inside to reflect all wavelengths of light except wavelengths from the at least one directed energy source.

10. The apparatus of claim 9 wherein the coating comprises a dielectric stack.

11. The apparatus of claim 1 wherein the at least one directed energy source comprises a plurality of lasers positioned around the transparent chamber, the plurality of lasers configured to provide a uniform energy pattern on the object.

12. The apparatus of claim 1 further comprising at least one temperature sensor to measure temperature of the object.

13. The apparatus of claim 12 further comprising a control system, the control system operatively connected to the at least one temperature sensor and the at least one directed energy source and wherein the control system is a closed loop system to adjust laser power to provide more or less energy to heat or maintain the temperature of the object.

14. The apparatus of claim 1 wherein the at least one directed energy source comprises at least one of a fiber fed laser, a diode laser, an array of diode lasers, a solid-state laser, and a gas laser.

15. The apparatus of claim 1 wherein the apparatus is configured to increase or decrease volume of the space.

16. The apparatus of claim 1 further comprising a plate within the transparent chamber wherein the plate is configured to travel along a Z-axis.

17. A 3D printer comprising the apparatus of claim 16.

18. The apparatus of claim 1 wherein the vacuum is reversible to create pressure within the chamber.

* * * * *